United States Patent
Franich et al.

(10) Patent No.: US 10,040,575 B2
(45) Date of Patent: Aug. 7, 2018

(54) DUAL MODE AIRCRAFT LIGHT ASSEMBLY

(71) Applicant: Goodrich Lighting Systems, Inc., Oldsmar, FL (US)

(72) Inventors: David Franich, Tempe, AZ (US); Philippe Lapujade, Chandler, AZ (US)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 16 days.

(21) Appl. No.: 15/211,164

(22) Filed: Jul. 15, 2016

(65) Prior Publication Data

US 2018/0016031 A1 Jan. 18, 2018

(51) Int. Cl.
*B64D 47/06* (2006.01)
*F21V 11/16* (2006.01)
*F21V 7/00* (2006.01)
*F21Y 115/10* (2016.01)
*F21W 101/06* (2006.01)
*F21W 107/30* (2018.01)

(52) U.S. Cl.
CPC ............... *B64D 47/06* (2013.01); *F21V 7/00* (2013.01); *F21V 11/16* (2013.01); *F21W 2101/06* (2013.01); *F21W 2107/30* (2018.01); *F21Y 2115/10* (2016.08)

(58) Field of Classification Search
CPC . F21V 11/16; F21V 7/00; B64D 47/06; F21Y 2115/10; F21W 2101/06
See application file for complete search history.

(56) References Cited

U.S. PATENT DOCUMENTS

| | | | |
|---|---|---|---|
| 6,559,777 B1 * | 5/2003 | Martin | B64D 47/06 340/981 |
| 7,663,506 B2 | 2/2010 | Lundberg et al. | |
| 8,123,377 B2 | 2/2012 | Lundberg et al. | |
| 8,905,587 B1 | 12/2014 | Bouckaert | |
| 9,061,772 B1 * | 6/2015 | Hartwell | B64D 47/06 |
| 2004/0196646 A1 * | 10/2004 | Machi | B64D 47/06 362/602 |
| 2009/0015436 A1 * | 1/2009 | Lundberg | B64D 39/00 340/945 |
| 2013/0107553 A1 * | 5/2013 | Desai | B64D 47/06 362/470 |
| 2013/0155705 A1 | 6/2013 | Peck et al. | |
| 2015/0036366 A1 | 2/2015 | Schoen | |

FOREIGN PATENT DOCUMENTS

| | | |
|---|---|---|
| CN | 201729275 | 2/2011 |
| EP | 1176053 | 1/2002 |
| EP | 2832646 | 2/2015 |
| EP | 2837566 | 2/2015 |
| EP | 3112265 | 1/2017 |

OTHER PUBLICATIONS

European Patent Office, European Search Report dated Feb. 28, 2018 in Application No. 17164362.0-1010.

* cited by examiner

*Primary Examiner* — Kevin Quarterman
(74) *Attorney, Agent, or Firm* — Snell & Wilmer, L.L.P.

(57) ABSTRACT

A dual mode light assembly for a forward position light of an aircraft includes a base, a visible light source mounted to the base that is configured to emit visible light, a covert light source mounted to the base that is configured to emit covert light, and a light shield mounted to the base. The light shield is configured to restrict transmission of the visible light to a visible light pattern and to restrict transmission of the covert light to a covert light pattern.

20 Claims, 6 Drawing Sheets

DUAL MODE AIRCRAFT LIGHT ASSEMBLY

GOVERNMENT LICENSE RIGHTS

This disclosure was made with government support under contract number W58RGZ-04-G-0023 awarded by the United States Army. The government has certain rights in the disclosure.

FIELD

The present disclosure relates to aircraft position lights, and more specifically, to dual mode aircraft light assemblies.

BACKGROUND

Aircraft position lights are regulated by the Federal Aviation Administration ("FAA") and other regulatory agencies. Position lights improve the visibility of aircraft, thereby allowing air traffic controllers and other aircraft to visually identify and orient the aircraft. In certain situations, non-visible lights, such as infrared lights, are utilized on an aircraft. Such non-visible lights enable an aircraft to operate in covert mode. In covert mode, bystanders using the naked eye are unable to see the non-visible lights but people equipped with appropriate devices, such as infrared detectors, are able to perceive the non-visible light and thereby identify and orient the aircraft.

SUMMARY

In various embodiments, the present disclosure provides a dual mode light assembly for a position light of an aircraft. The dual mode light assembly includes a base, a visible light source mounted to the base that is configured to emit visible light, a covert light source mounted to the base that is configured to emit covert light, and at least one light shield mounted to the base. The at least one light shield is configured to restrict transmission of the visible light to a visible light pattern and to restrict transmission of the covert light to a covert light pattern.

In various embodiments, the position light is a forward position light and the at least one light shield is a single light shield that is laterally offset relative to the visible light source on the base to block inboard transmission of the visible light. The visible light pattern may be bounded by a blocking element of at least one of the dual mode light assembly and the aircraft such that a horizontal angle of the visible light pattern between the single light shield and the blocking element is at least 110 degrees but less than 120 degrees. The blocking element may include a blocking surface of the base. The base may be angled in an aft direction.

In various embodiments, the single light shield is disposed below the covert light source on the base to block downward transmission of the covert light. Accordingly, a vertical angle of the covert light pattern between a horizontal plane and the single light shield may be at most 45 degrees downwards. In various embodiments, the dual mode light assembly further includes a reflector mounted to the base that is configured to reflect the covert light in an aft direction such that a horizontal angle of the covert light pattern from a line of flight of the aircraft is at least 120 degrees. The reflector may be laterally offset relative to the covert light source on the base to block inboard transmission of the covert light.

In various embodiments, the visible light source may include a light emitting diode. In various embodiments, the visible light source includes multiple light emitting diodes vertically aligned across the base. In various embodiments, the covert light source includes an infrared emitter. In various embodiments, the visible light source is both vertically and horizontally offset from the covert light source. In various embodiments, the visible light source is laterally offset relative to the covert light source. The single light shield may be an arch structure that extends outward and across the base. Components of the base may be mounted to the base under a span of the arch. In various embodiments, the single light shield may be separate from a housing of the dual mode light assembly.

Also disclosed herein, according to various embodiments, is a dual mode light assembly for a forward position light of an aircraft. The dual mode light assembly includes a base, a visible light source, a covert light source, a single light shield, and a reflector. The visible light source may be mounted to the base and may be configured to emit visible light. The covert light source may be mounted to the base and may be configured to emit covert light. The single light shield may be mounted to the base and may be configured to restrict transmission of the visible light to a visible light pattern and to restrict transmission of the covert light to a covert light pattern. In various embodiments, the single light shield may be laterally offset relative to the visible light source on the base to block inboard transmission of the visible light. In various embodiments, the visible light pattern may be bounded by a blocking element of at least one of the dual mode light assembly and the aircraft. In various embodiments, a horizontal angle of the visible light pattern between the single light shield and the blocking element may be at least 110 degrees but less than 120 degrees. In various embodiments, the single light shield may be disposed below the covert light source on the base to block downward transmission of the covert light, thus a vertical angle of the covert light pattern between a horizontal plane and the single light shield may be at most 45 degrees downwards. In various embodiments, the reflector may be mounted to the base and may be configured to reflect the covert light in an aft direction such that a horizontal angle of the covert light pattern from a line of flight of the aircraft is at least 120 degrees.

Also disclosed herein, according to various embodiments, is a dual mode light assembly for an aft position light of an aircraft. The dual mode light assembly includes a base, a visible light source mounted to the base that is configured to emit visible light, a covert light source mounted to the base that is configured to emit covert light, a first light shield configured to limit restrict transmission of the visible light to a visible light pattern, and a second light shield mounted to the base and configured to restrict transmission of the covert light to a covert light pattern. In various embodiments, a horizontal angle of the visible light pattern is 120 degrees and a vertical angle of the covert light pattern between a horizontal plane and the second light shield is at most 45 degrees downwards.

Also disclosed herein, according to various embodiments, is an aircraft having a forward dual mode light assembly disposed on each side of the aircraft and an aft dual mode light assembly disposed on an aft section of the aircraft. Each of the forward dual mode light assemblies may have a first visible light source and a first covert light source mounted to a first single base. The aft dual mode light assembly may include a second visible light source and a second covert light source mounted to a second single base.

In various embodiments, the first light shield may extend in an aft direction from peripheral edges of an aft facing surface of the base. In various embodiments, the visible light source may include multiple light emitting diodes disposed around the covert light source.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a dual mode light assembly is disclosed herein. The dual mode light assembly includes both a visible light source and a covert light source mounted to the same base. Stated differently, the dual mode light assembly disclosed herein enables an aircraft to operate in two modes, either visible mode or covert mode, without having two separate assemblies/modules for each different type of light.

Figure 1:
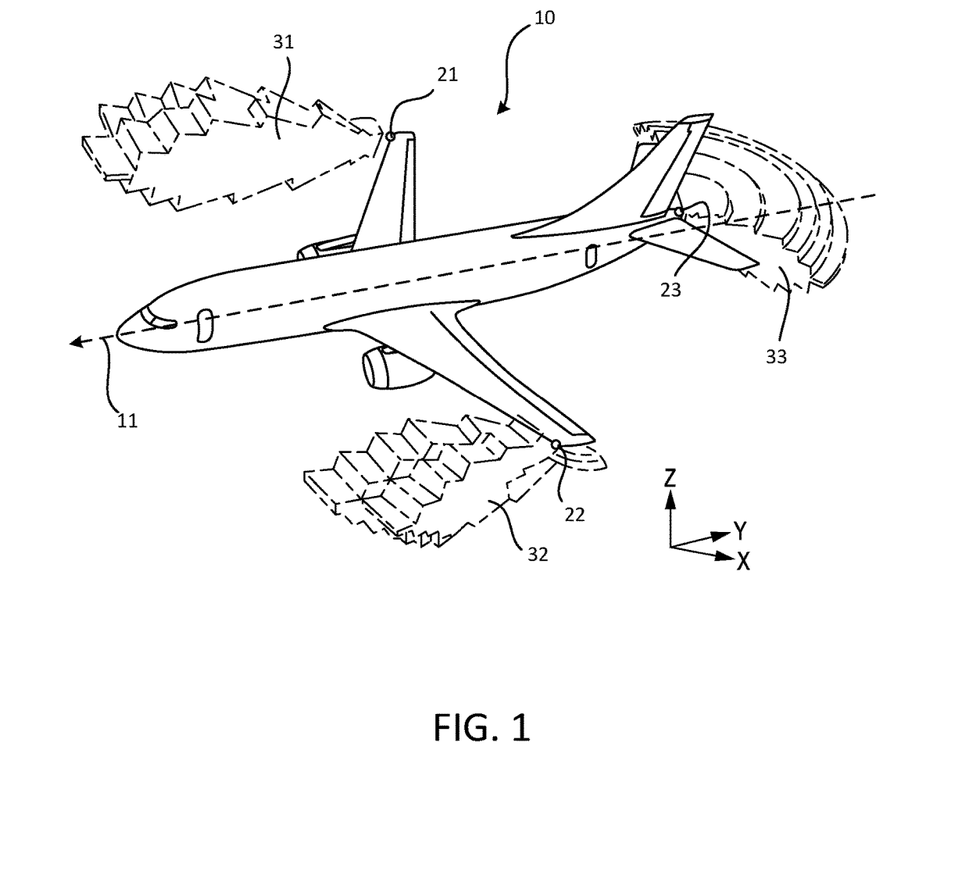
FIG. 1 illustrates a perspective view of position light patterns on an aircraft, in accordance with various embodiments.

With reference to FIG. 1, and in accordance with various embodiments, an aircraft 10 generally includes forward facing position lights 21, 22 disposed on each side of the aircraft 10. In various embodiments, the forward facing position lights 21, 22 are disposed as far apart laterally as practicable on the aircraft 10. The aircraft 10 generally also includes an aft facing position light 23. Generally, the right forward position light 21 emits green visible light 31, the left forward position light 22 emits red visible light 32, and the aft position light 23 emits white light 33. As mentioned above, if the aircraft 10 operates in a covert mode, conventional aircraft 10 generally include separate position light assemblies disposed proximate or adjacent to the visible lights 21, 22, 23.

XYZ axes are shown in the figures for convenience, with z extending perpendicular to the xy plane. In that regard, a measurement point displaced in the positive z axis direction from a given reference point may be considered "above" or on "top" of the given reference point. In contrast, a measurement point displaced in the negative z axis direction from the given reference point may be considered "below" or on "bottom" of the given reference point. In that regard, the terms "top" and "bottom" may refer to relative positions along the z axis.

Also shown in FIG. 1 is an indication of a line of flight 11 of the aircraft 10. The XYZ axes, as well as the terms "horizontal" and "vertical", are associated with and relative to the line of flight 11. Said differently, a horizontal plane is a plane that is parallel to the line of flight 11 and not necessarily parallel to ground. Accordingly, as defined herein, "horizontal angles" are angles are in the xy plane, which is relative to the line of flight 11, and "vertical angles" are angles in the yz plane, which is relative to the line of flight 11. Additionally, the terms "inboard" and "outboard" are position terms relative to the fuselage of the aircraft 10. Said differently, if a first component is inboard relative to a second component, the first component is nearer the fuselage than the second component.

Figure 2:
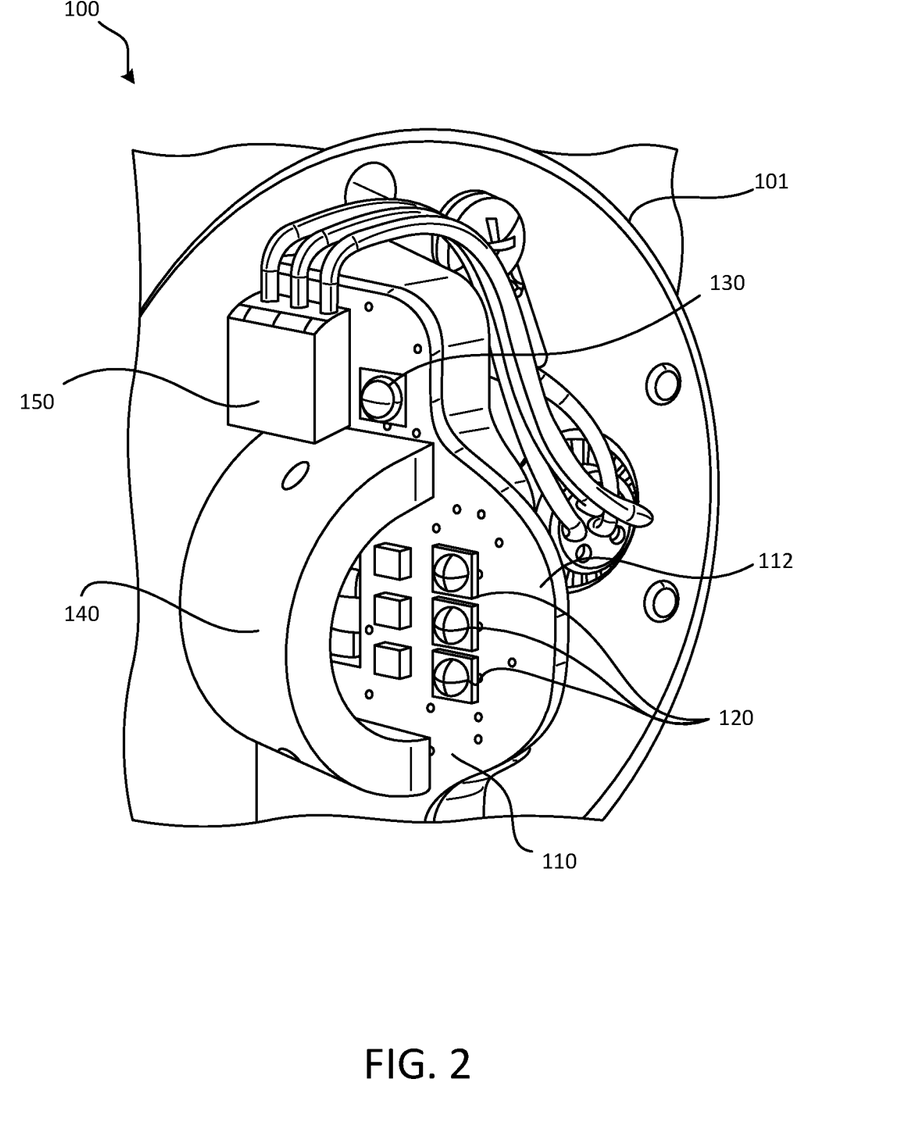
FIG. 2 illustrates a perspective view of a dual mode light assembly for a forward position light of an aircraft, in accordance with various embodiments.

FIG. 2 shows a perspective view of a dual mode light assembly 100 for a forward position light of the aircraft 10. A dual mode light assembly 200 for an aft position light is described in detail below with reference to FIG. 5. The dual mode light assembly 100, according to various embodiments, includes a base 110, one or more visible light sources 120, one or more covert light sources 130, a light shield 140, and a reflector 150. As mentioned above, both the visible light source 120 and the covert light source 130 may be mounted, according to various embodiments, to the same base 110. The base 110 may be a wiring board, a circuit board, a wiring substrate, a circuit substrate, a printed wiring assembly, a printed circuit assembly, or a printed circuit board, among others. Thus, the base 110 may have circuity components and other features attached thereto.

In various embodiments, the visible light source 120 is configured to emit a visible light. In various embodiments, the visible light source 120 may be a light emitting diode or another device or article that produces visible light, such as electromagnetic radiation having a wavelength of about 400 nm to less than 700 nm. As mentioned above, the visible light source 120 may have a specific color (e.g., wavelength) based on which side of the aircraft 10 the dual mode light assembly 100 is positioned. The covert light source 130 is configured to emit a covert light. As used herein, the term "covert light" refers to electromagnetic radiation that is not visible to the naked human eye. In various embodiments, for example, the covert light source 130 may be an infrared emitter that emits infrared radiation, such as radiation having a wavelength of about 700 nm to 1000 nm.

As mentioned above, regulatory aircraft agencies, such as the Federal Aviation Administration ("FAA"), often establish rules regarding the direction and transmission ranges of visible light. Also as mentioned above, government or military divisions may require, in addition to the visible light standards, covert light standards regarding the transmission patterns of covert light. Accordingly, the dual mode light assembly 100 is configured to comply with visible light standards and covert light standards.

Figure 3:
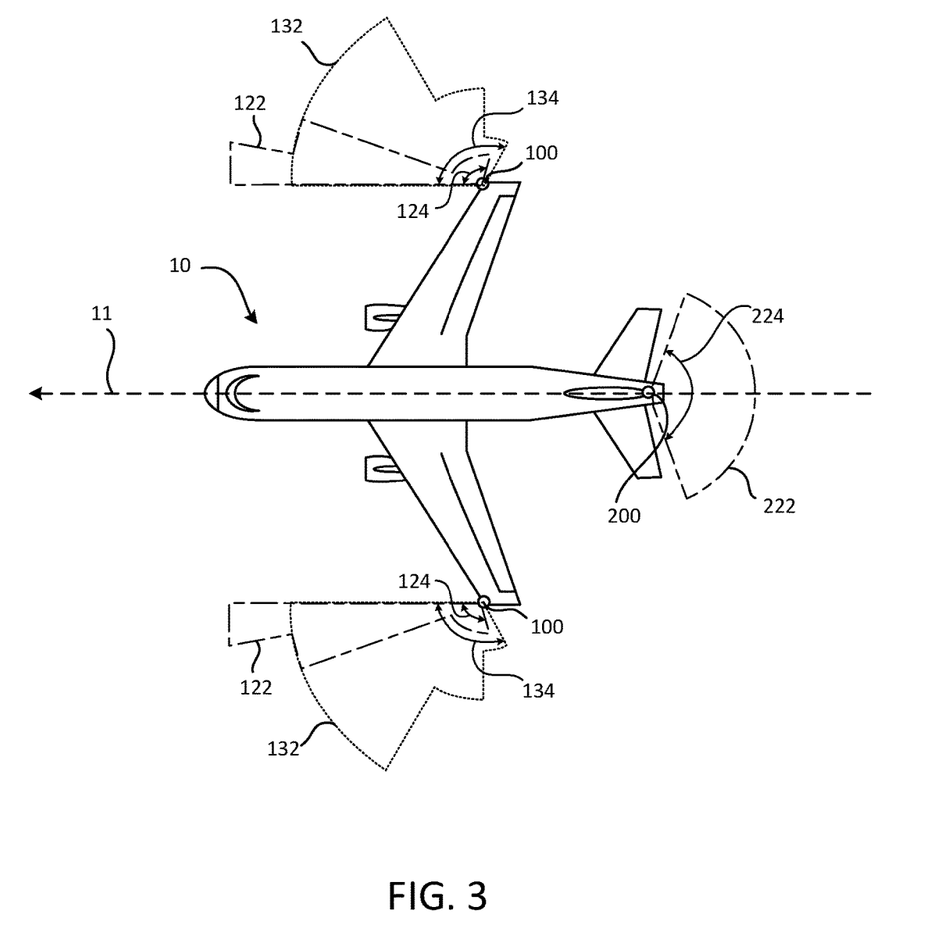
FIG. 3 illustrates a top view of an aircraft showing both a visible light pattern and a covert light pattern, in accordance with various embodiments.
Figure 4:
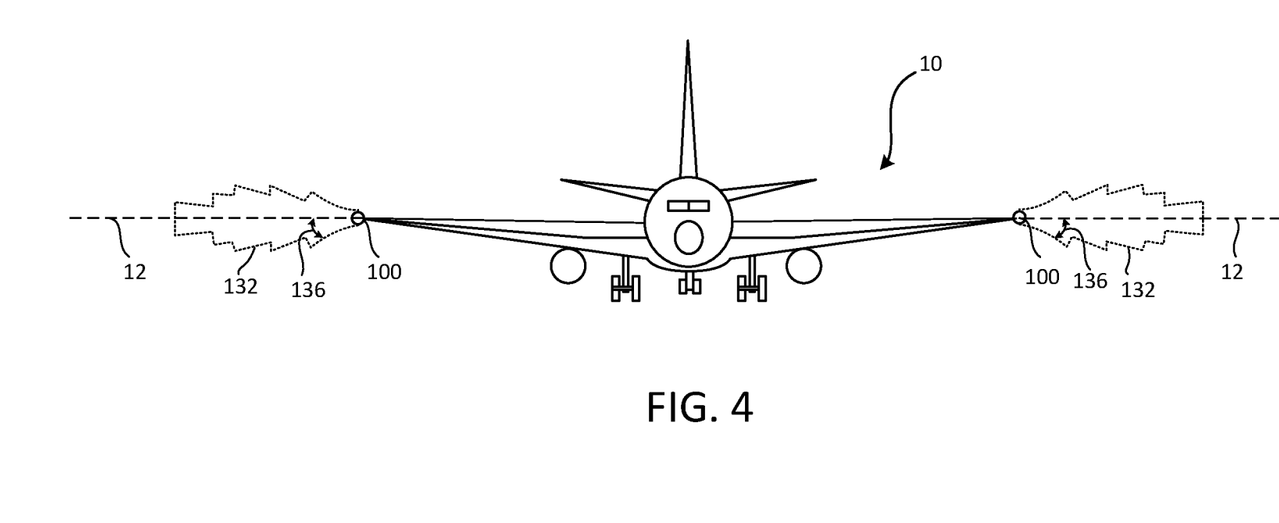
FIG. 4 illustrates a front view of an aircraft showing a covert light pattern, in accordance with various embodiments.

With reference to FIG. 2-4, and in accordance with various embodiments, the light shield 140 is shown mounted to the base and is configured to restrict transmission of both the visible light and the covert light. Said differently, the light shield 140 blocks at least portions of the visible light to form a visible light pattern 122 (FIG. 3) and at least portions of the covert light to form a covert light pattern 132 (FIGS. 3 and 4). The dual mode light assembly 100, according to various embodiments, may also include a reflector 150 that is configured to further contribute to the light patterns 122, 132.

In various embodiments, the one or more visible light sources 120 are disposed outboard relative to the light shield 140. The light shield 140 may be made from a material that blocks light and thus does not allow light to transmit through itself. In such a configuration, transmission of visible light is blocked from being directed inboard towards the fuselage of the aircraft by the light shield 140. Such a feature may be beneficial, according to various embodiments, to prevent the visible light from distracting the pilot and/or passengers of the aircraft 10. The dual mode light assembly 100 may also include a blocking element, such as a blocking surface 112 of the base 110, that may provide an opposite boundary for the visible light pattern 122. As described in greater detail below, the blocking surface 112 may also provide a boundary for the covert light pattern 132.

In various embodiments, inboard transmission of visible light may be restricted by the light shield 140 and outboard transmission of visible light may be restricted by the blocking surface 112 of the base 110, according to various embodiments. Accordingly, the visible light pattern 122 may have a horizontal angle 124 that is restricted between the light shield 140 on one side and the blocking surface 112 of the base 110 on the other. In various embodiments, the horizontal angle 124 of the visible light pattern 122 may be at least about 110 degrees but less than about 120 degrees, wherein the term about in this context only means +/−2 degrees. In other words, certain regulations may suggest or require that visible light should be transmitted up to 110 degrees from a vertical plane parallel to the line of flight 11. However, such regulations may also suggest or require that the visible light not be transmitted beyond 120 degrees from the vertical plane parallel to the line of flight 11.

In various embodiments, the base 110 may be angled in an aft direction. As shown in FIG. 2, the blocking surface 112 is angled towards the aft of the aircraft 10, thus enabling the visible light pattern to extend, for example, the entire 110 degrees from the line of flight 11 of the aircraft 10. In various embodiments, the base may be disposed at an angle to the vertical plane that contains the line of flight.

As mentioned above, it may be beneficial in various embodiments to limit the transmission of the covert light pattern 134. Accordingly, in various embodiments, light shield 140 may be disposed below the covert light source 130 in order to block downward transmission of the covert light. In such embodiments, a vertical angle 136 of the covert light pattern 132 (FIG. 4) between a horizontal plane 12 and the light shield 140 is at most about 45 degrees downwards, wherein the term about in this context only means +/−2 degrees. Regarding the covert light pattern 132, the reflector 150 may be mounted to the base 110 in various embodiments and may be configured to reflect the covert light in an aft direction such that a horizontal angle 134 of the covert light pattern 132 from the line of flight 11 of the aircraft 10 is at least 120 degrees. Said differently, the covert light pattern 132 may extend, whether suggested by regulation or not, up to and beyond 120 degrees (the horizontal angle 134 shown in FIG. 3), as measured from a vertical yz plane parallel to the line of flight 11 of the aircraft 10. In various embodiments, the reflector 150 may be laterally offset (e.g., inboard) relative to the covert light source 130 to block inboard transmission of the covert light, similar to the inboard transmission blocking of the light shield 140 for the visible light.

As mentioned above, in various embodiments, the visible light source 120 may include multiple light emitting diodes. The multiple light emitting diodes may be aligned vertically, for example, across the surface of the base 110. The relative positioning of the visible light source 120 and the covert light source 130 may be offset. In various embodiments, the offset may be both horizontal and vertical. For example, the visible light source 120 may be disposed outboard relative to the covert light source 130.

Because the light shield 140 restricts both the visible light and the covert light, the light shield 140 may have a shape that is specific to a given configuration. For example, in various embodiments the light shield 140 may have an arch structure that extends outward away from and across a portion of the base 110. Such a structure allows for circuitry components and other wiring features to be mounted to the base 110 'under' the span of the arch. In various embodiments, the light shield 140 may have other shapes, such as triangular, pyramid-like, conical, frusto-conical, etc. In various embodiments, the light shield 140 is not part of an external housing of the dual mode light assembly 100. Said differently, the light shield 140 may be separate and independent from any housing of the dual mode light assembly 100 and/or any components external to the dual mode light assembly 100.

Figure 5:
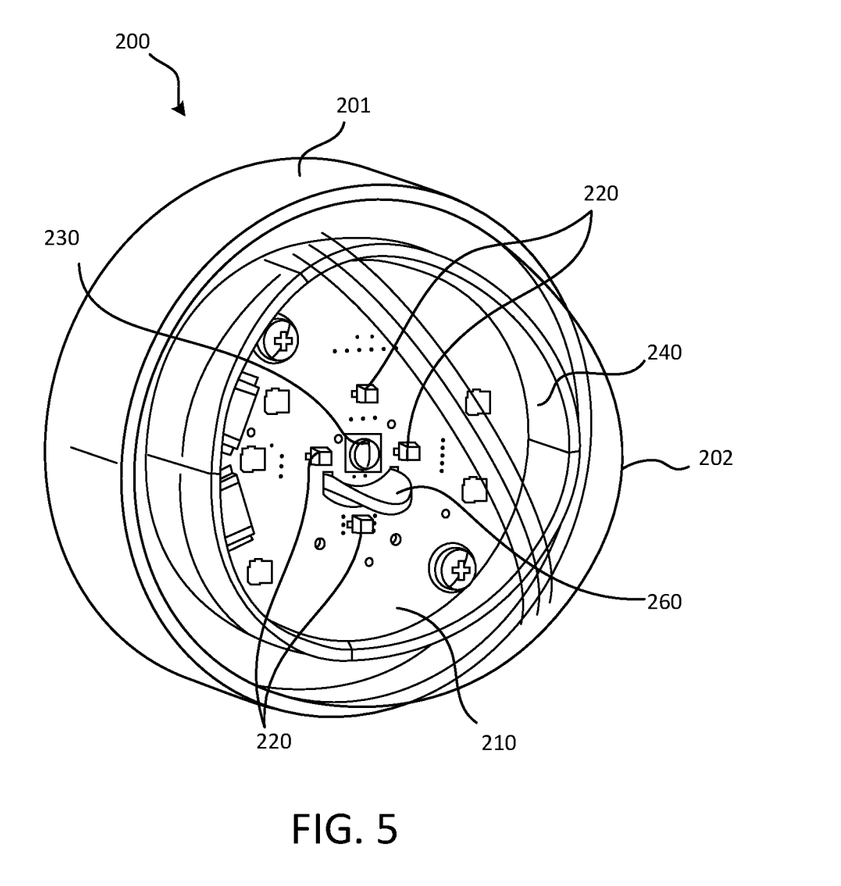
FIG. 5 illustrates a perspective view of a dual mode light assembly for an aft position light of an aircraft, in accordance with various embodiments.
Figure 6:
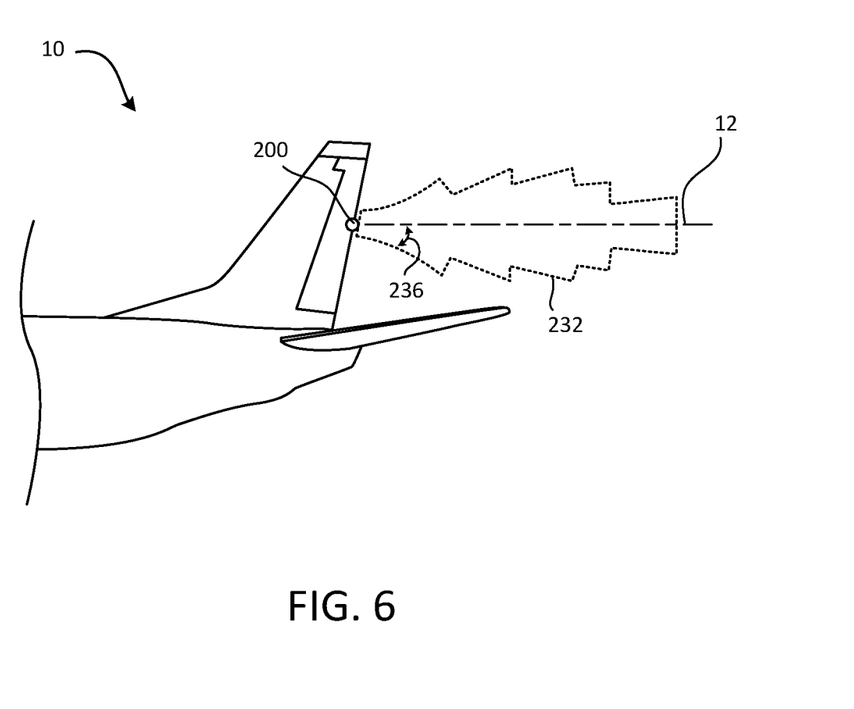
FIG. 6 illustrates side view of an aircraft showing a covert light pattern, in accordance with various embodiments.

With reference to FIGS. 5 and 6, and in accordance with various embodiments, the dual mode light assembly 200 for an aft position light of the aircraft 10 is shown. The dual mode light assembly 200 includes a base 210, a plurality of visible light sources 220, a covert light source 230, a first light shield 240, and a second light shield 260. The first light shield 240 may be configured to restrict the visible light to a visible light pattern 222 (FIG. 3). The visible light pattern 222 may have a horizontal angle 224 that is about 120 degrees having a centerline parallel to the line of flight 11 of the aircraft. In various embodiments, the first light shield may extend in an aft direction from peripheral edges of an aft facing surface of the base, as shown in FIG. 5.

In various embodiments, the second light shield 260 may be mounted to the base and may be configured to restrict transmission of covert light from the covert light source 230 to a covert light pattern 232. The covert light pattern 232 may have a vertical angle 236, as measured between a horizontal plane 12 and the second light shield 260, that is at most about 45 degrees downwards. In various embodiments, the plurality of visible light sources 220 may be disposed around the covert light source 230 to ensure that the second light shield 260 does not inadvertently block the visible light in a certain direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A dual mode light assembly for a position light of an aircraft, the dual mode light assembly comprising:
    a base;
    a visible light source mounted to the base and configured to emit visible light;
    a covert light source mounted to the base and configured to emit covert light; and
    at least one light shield mounted to the base and configured to restrict transmission of the visible light to a visible light pattern and to restrict transmission of the covert light to a covert light pattern;
    wherein:
        the position light is a forward position light
        the at least one light shield is a single light shield; and
        the visible light source is outboard and laterally offset relative to the single light shield such that inboard transmission of the visible light is blocked by the single light shield.

2. The dual mode light assembly of claim 1, wherein the visible light pattern is bounded by a blocking element of at least one of the dual mode light assembly and the aircraft, wherein a horizontal angle of the visible light pattern between the single light shield and the blocking element is at least 110 degrees but less than 120 degrees.

3. The dual mode light assembly of claim 2, wherein the blocking element comprises a blocking surface of the base.

4. The dual mode light assembly of claim 3, wherein the base is angled in an aft direction.

5. The dual mode light assembly of claim 1, wherein the single light shield is disposed below the covert light source on the base to block downward transmission of the covert light.

6. The dual mode light assembly of claim 5, wherein a vertical angle of the covert light pattern between a horizontal plane and the single light shield is at most 45 degrees downwards.

7. The dual mode light assembly of claim 1, further comprising a reflector mounted to the base configured to reflect the covert light in an aft direction such that a horizontal angle of the covert light pattern from a line of flight of the aircraft is at least 120 degrees.

8. The dual mode light assembly of claim 7, wherein the reflector is laterally offset relative to the covert light source on the base to block inboard transmission of the covert light.

9. The dual mode light assembly of claim 1, wherein the visible light source comprises multiple light emitting diodes vertically aligned across the base.

10. The dual mode light assembly of claim 1, wherein the covert light source comprises an infrared emitter.

11. The dual mode light assembly of claim 1, wherein the visible light source is both vertically and horizontally offset from the covert light source.

12. The dual mode light assembly of claim 1, wherein the visible light source is laterally offset relative to the covert light source.

13. The dual mode light assembly of claim 1, wherein the single light shield comprises an arch structure extending outward and across the base, wherein components of the base are mounted to the base in a span of the arch structure.

14. The dual mode light assembly of claim 1, wherein the single light shield is separate from a housing of the dual mode light assembly.

15. A dual mode light assembly for a position light of an aircraft, the dual mode light assembly comprising:
a base;
a visible light source mounted to the base and configured to emit visible light
a covert light source mounted to the base and configured to emit covert light and
at least one light shield mounted to the base and configured to restrict transmission of the visible light to a visible light pattern and to restrict transmission of the covert light to a covert light pattern;
wherein:
the position light is an aft position light;
the at least one light shield comprises a first light shield and a second light shield;
the first light shield is configured to restrict transmission of the visible light such that a horizontal angle of the visible light pattern is 120 degrees; and
the second light shield is configured to restrict transmission of the covert light such that a vertical angle of the covert light pattern between a horizontal plane and the second light shield is at most 45 degrees downwards.

16. The dual mode light assembly of claim 15, wherein the first light shield extends in an aft direction from peripheral edges of an aft facing surface of the base.

17. The dual mode light assembly of claim 15, wherein the visible light source comprises multiple light emitting diodes disposed around the covert light source.

18. A dual mode light assembly for a position light of an aircraft, the dual mode light assembly comprising:
a base;
a visible light source mounted to the base and configured to emit visible light;
a covert light source mounted to the base and configured to emit covert light; and
at least one light shield mounted to the base and configured to restrict transmission of the visible light to a visible light pattern and to restrict transmission of the covert light to a covert light pattern;
wherein the visible light pattern is bounded by a blocking element of at least one of the dual mode light assembly and the aircraft, wherein a horizontal angle of the visible light pattern between the at least one light shield and the blocking element is at least 110 degrees but less than 120 degrees.

19. The dual mode light assembly of claim 18, wherein the position light is a forward position light and wherein the at least one light shield is a single light shield that is laterally offset relative to the visible light source on the base to block inboard transmission of the visible light.

20. The dual mode light assembly of claim 18, further comprising a reflector mounted to the base configured to reflect the covert light in an aft direction such that a horizontal angle of the covert light pattern from a line of flight of the aircraft is at least 120 degrees.

* * * * *